United States Patent

Shiki

[11] 3,965,678
[45] June 29, 1976

[54] AIR DISTRIBUTION PIPE FOR EXHAUST GAS MANIFOLD

[75] Inventor: Kazuhiro Shiki, Toyoda, Japan

[73] Assignee: Toyota Jidosha Kogyo Kabushiki Kaisha, Toyoda, Japan

[22] Filed: Mar. 5, 1975

[21] Appl. No.: 555,434

[30] Foreign Application Priority Data
Sept. 10, 1974 Japan .................... 49-109066[U]

[52] U.S. Cl. ............................................. 60/305
[51] Int. Cl.² ........................................ F01N 3/10
[58] Field of Search ............................ 60/304, 305

[56] References Cited
UNITED STATES PATENTS

| | | | |
|---|---|---|---|
| 2,174,626 | 10/1939 | Fogas | 60/304 |
| 3,091,078 | 5/1963 | Dworak | 60/304 |
| 3,729,937 | 5/1973 | Haddad | 60/305 X |
| 3,869,859 | 3/1975 | Thornburgh | 60/305 |

Primary Examiner—Carlton R. Croyle
Assistant Examiner—Thomas I. Ross
Attorney, Agent, or Firm—Stevens, Davis, Miller & Mosher

[57] ABSTRACT

An improved device for supplying additional combustion air into exhaust ports of a multi-cylinder internal combustion engine. The device comprises a horizontally disposed air distribution pipe communicating with a source of air supply and having a flat bottom wall or walls supported on flat upper surfaces formed on a cylinder head or exhaust manifold portion. The pipe is formed with a plurality of apertures through its flat bottom walls. Each of these apertures is aligned with one of a plurality of air distribution bores formed in the cylinder head or exhaust manifold portion and each communicating with one of the exhaust ports. The pipe is directly secured to the cylinder head or exhaust manifold portion by metal bands without the aid of any branch or connecting pipes.

19 Claims, 5 Drawing Figures

AIR DISTRIBUTION PIPE FOR EXHAUST GAS MANIFOLD

BACKGROUND OF THE INVENTION

This invention relates to an improvement in the automobile exhaust gas purifying apparatus and more particularly in the device for supplying air into exhaust ports of a multi-cylinder internal combustion engine on an automobile to cause additional combustion therein for purification of exhaust gas prior to its discharge into the atmosphere.

A device typically known in the art for supplying additional combustion air into exhaust ports of a multi-cylinder internal combustion engine on an automobile comprises a main pipe communicating with a source of air supply and a plurality of branch pipes each extending from the main pipe into an air bore which is provided in a cylinder head and communicates with one of the exhaust ports. The main pipe is secured to the cylinder head by union joints. The device is, thus, complicated in construction and any dimensional inaccuracies caused during the manufacture of the device often makes it difficult to properly align each of the branch pipes with the corresponding air bore in the cylinder head. The device is often very difficult to install on the cylinder head properly, and once it is installed, it is difficult to detach the device as the necessity arises. The branch pipes are usually joined to the main pipe by welding and this welding work requires a considerably large amount of time and labor. Connection of the branch pipes into the respective air bores in the cylinder head is an additional time- and labor-consuming job. Furthermore, the length of the branch pipes means a corresponding wasteful increase in the space occupied by the device in the automobile engine compartment.

SUMMARY OF THE INVENTION

It is an object of this invention to improve the device of the character as outlined above and provide a device which is simple in construction and easy to install on an automobile engine.

It is another object of this invention to provide such a device which is so compactly constructed as to occupy only a reasonably large space when installed in an automobile engine compartment.

It is still another object of this invention to provide such a device which can be installed on an automobile engine without the aid of any union joints.

In order to attain the foregoing objects in accordance with the principles of this invention, there is provided a device essentially comprising a horizontally disposed pipe communicating with a source of air supply and having an at least partially flat bottom surface contacting a flat surface formed on the upper end of an engine structure. A plurality of apertures are provided in the flat bottom surface of the pipe and those apertures are aligned with a plurality of air bore provided in the engine structure each of which communicates with one of exhaust ports of an engine. The air received into the pipe from the source of supply flows out through the apertures and the air bores into the exhaust ports to burn harmful uncombusted constituents of exhaust gas prior to its discharge through an exhaust manifold.

According to one embodiment of this invention, the device is installed on the cylinder head of the engine, while another embodiment is to install the device on the exhaust manifold.

DETAILED DESCRIPTION

Figure 1:
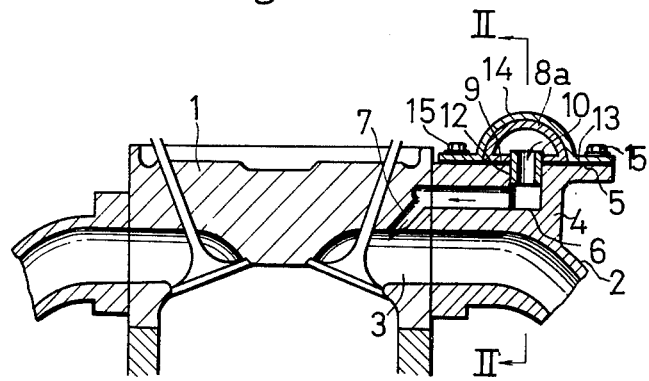
FIG. 1 is a fragmentary vertical sectional view in front elevation of a four-cylinder automobile engine incorporating the device according to one embodiment of this invention.
Figure 2:
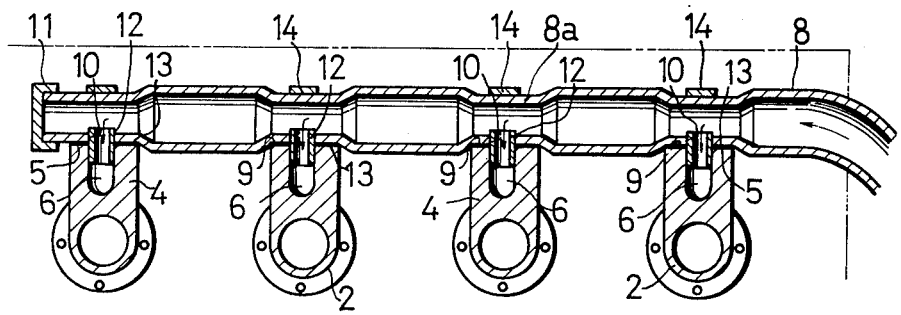
FIG. 2 is a vertical sectional view taken along the line II—II of FIG. 1.

Referring to FIGS. 1 and 2 of the drawings, there is shown in a fragmentary fashion a four-cylinder internal combustion engine having a cylinder head 1 in which four exhaust ports 3 are formed. Each of the exhaust ports 3 is connected with one of the four inlet pipes 2 of an exhaust manifold. A projecting support 4 is formed on the upper side of each inlet pipe 2 of the exhaust manifold. Each projecting support 4 has a flat upper surface 5 and is provided therethrough with an air bore 6 which has an L-shaped form in vertical section as seen in FIG. 1. Each projecting support 4 is positioned immediately in contact with an adjacent side of the cylinder head 1 and joined thereto in an appropriate manner. The air bore 6 has an inlet which is open at the upper surface 5 of the projecting support 4 and an outlet which is located at right angles to the inlet and is open on that side of the projecting support 4 which contacts the adjacent side of the cylinder head 1. The outlet of each air bore 6 communicates with the inlet of an adjacent air injection port 7 provided in the cylinder head 1 in an inwardly and downwardly extending manner. Each air injection port 7 is open at its outlet into one exhaust port 3.

An air supply pipe 8 is horizontally disposed and supported on the flat upper surfaces 5 of the projecting supports 4 on the exhaust manifold. The air supply pipe 8 is generally circular in cross section, but includes four equally spaced portions 8a which are substantially semi-circular in cross section. Each semi-circular portion 8a has a flat bottom surface 9 which fits the flat upper surface 5 of one of the projecting supports 4 on the exhaust manifold. Each semi-circular portion 8a of the air supply pipe 8 includes an aperture 10 formed in the center of its flat bottom surface 9 and providing communication between the air bore 6 and the interior of the air supply pipe 8. The air supply pipe 8 is closed by a cap 11 at one end and the other end of the pipe 8 which is located on the opposite side of the exhaust manifold from the cap 11 is connected to an air pump (not shown) or any other appropriate source of air supply via a conduit not shown.

A tubular insert 12 is received in each air bore 6 in the vertically extending portion thereof and extends at its upper end into the air supply pipe 8 through the aperture 10 thereof. The tubular insert 12 is primarily intended for facilitating connection between each aperture 10 of the air supply pipe 8 and the corresponding air bore 6 in proper mutual alignment. Such facilitated connection may be accomplished either by inserting the tubular inserts 12 into the respective apertures 10 and then into the respective air bores 6 or vice versa. A gasket 13 is interposed between the flat upper surface 5 of each projecting support 4 on the exhaust manifold and the corresponding flat bottom surface 9 of the pipe 8 and encircles the tubular insert 12 in an air-tight manner. The air supply pipe 8 is secured to the exhaust manifold by four metal bands 14 which are generally semi-circular in longitudinal section. Each metal band 14 includes a semi-circular portion encircling the corresponding semi-circular portion 8a of the pipe 8 in close contact therewith. The opposite ends of the semi-circular portion of the metal band 14 terminate in a pair of flat lower end portions horizontally extending in opposite directions. The flat end portions of the metal band 14 fit the flat upper surface 5 of the projecting support 4 on the exhaust manifold and are connected thereto by bolts 15.

In operation, the air delivered from the air pump into the air supply pipe 8 flows into the exhaust ports 3 through the aperture 10 of the air supply pipe 8, the air bores 6 and the injection ports 7 in the direction of the arrows in FIG. 1. The air thus distributed into the exhaust ports 3 assists additional combustion of exhaust gas to burn the greater part of the uncombusted hydrocarbon and carbon monoxide contained therein and carried forward from the cylinder bores, whereby the exhaust gas discharged through the exhaust manifold contains only a negligible amount of harmful uncombusted components.

Each semi-circular portion 8a of the air supply pipe 8 is preferably somewhat smaller in diameter than the remaining portions thereof, as illustrated in FIG. 2, to facilitate positioning of the associated metal band 14 thereabout.

Figure 3:
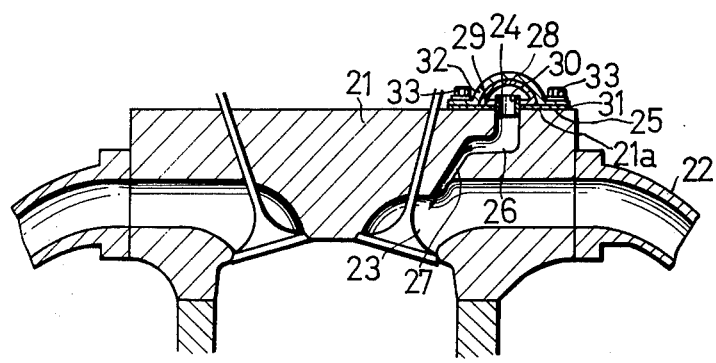
FIG. 3 is a view similar to FIG. 1 illustrating the device according to another embodiment of this invention.

According to another embodiment of this invention as illustrated in FIG. 3, an air supply or distribution pipe 28 is installed on a cylinder head 21, instead of on an exhaust manifold 22. The cylinder head 21 is formed with a flat upper surface 21a adjacent to the exhaust manifold 22. A plurality of (four in case of a four-cylinder engine) air bores 26 which are generally L-shaped in vertical section are formed in the cylinder head 21. Each air bore 26 has at its upper end an inlet which is open at the upper surface 21a of the cylinder head 21. At its lower outlet end, each air bore 26 merges into an air injection port 27 formed in the cylinder head 21. Each injection port 27 extends downwardly in an oblique direction and terminates in an outlet which is open into an exhaust port 23 communicating with the exhaust manifold 22.

The air supply pipe 28 has a semi-circular cross-section substantially along its entire length, which defines a flat bottom surface 29. The air supply pipe 28 is positioned horizontally and the flat bottom surface 29 of the pipe 28 rests on the flat upper surface 21a of the cylinder head 21 with a gasket 31 in between. The air supply pipe 28 includes a plurality of apertures 30 formed in the bottom surface 29 thereof. Each aperture 30 is aligned with one air bore 26 in the cylinder head 21 and provides communication between the interior of the pipe 28 and the air bore 26. A hollow cylinder insert 24 is received at its upper end in each aperture 30 of the pipe 28 and extends through the gasket 31 into the associated air bore 26. The air supply pipe 28 is secured to the cylinder head 21 by a plurality of metal bands 32 which are preferably equal spaced from one another and each positioned adjacent to one air bore 26. Each metal band 32 is generally semi-circular in longitudinal section and comprises a semi-circular central portion encircling the air supply pipe 28 in close contact therewith. The opposite ends of the semi-circular central portion of the metal band 32 terminate in a pair of flat lower end portions horizontally extending in opposite directions. The flat end portions of the metal band 32 closely fit the flat upper surface 21a of the cylinder head 21 and are connected thereto by a pair of bolts 33.

Figure 4:
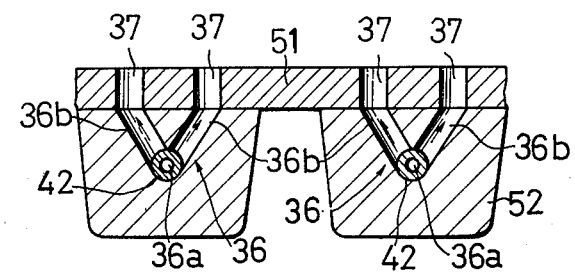
FIG. 4 is a fragmentary horizontal sectional view showing the device according to still another embodiment of this invention.
Figure 5:
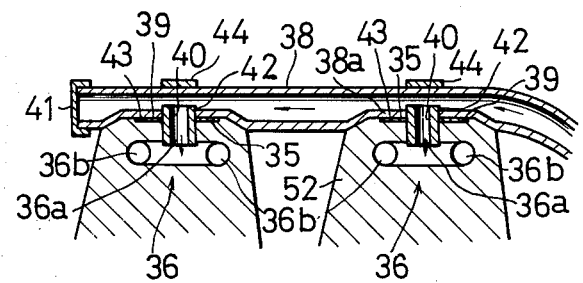
FIG. 5 is a vertical sectional view in side elevation of the device shown in FIG. 4.

Attention is now directed to FIGS. 4 and 5 illustrating a further embodiment of this invention in which the invention is applied to a four-cylinder engine and a horizontally disposed air supply or distribution pipe is supported on an exhaust manifold. The exhaust manifold is formed on the upper side thereof with a pair of upwardly extending projections 52. The projections 52 are located in close contact with an adjacent side wall of a cylinder head 51. Each projection 52 is formed to span over two inlets of the exhaust manifold and provides a support for the air supply pipe 38. The air supply pipe 38 is generally circular in cross-section, but includes a pair of intermediate portions 38a which are semi-circular in cross-section. Each semi-circular portion 38a has a flat bottom surface 39 and an aperture 40 is formed in the center of the bottom surface 39. Each projecting support 52 has a flat upper surface 35. An air bore 36 is formed in each projecting support 52 and is open in the center of the flat upper surface 35 thereof. Each air bore 36 comprises a vertically extending portion 36a having an upper end which is open into the air supply pipe 38 through an adjacent aperture 40. The vertically extending portion 36a terminates at its lower end in a pair of horizontally extending portions 36b which are directed toward the cylinder head 51. The horizontally extending portions 36b of each air bore 36 are disposed in a substantially mutually perpendicular relationship and each merges into one of four air injection ports 37 formed in the cylinder head 51 and each open into one of the four ports of the engine.

The flat bottom surface 39 of each semi-circular portion 38a of the air supply pipe 38 closely fits and rests on the flat upper surface 35 of one of the projecting supports 52 on the exhaust manifold with a gasket 43 in between. A hollow cylindrical insert 42 is received at its upper end in each aperture 40 of the air supply pipe 38 and extends downwardly into the vertically extending portion 36a of one air bore 36 through the associated gasket 43. The air supply pipe 38 is secured to the projecting supports 52 by a pair of metal bands 44 which are generally semi-circular in longitudinal section. Each metal band 44 comprises a semi-circular central portion encircling one semi-circular portion 38a of the air supply pipe 38 in close contact therewith. The semi-circular central portion of each metal band 44 terminates in a pair of flat end portions horizontally extending in opposite directions. The flat end portions of the metal band 44 closely fit the flat upper surface 35 of each projecting support 52 and are connected thereto by a pair of bolts to hold the air supply pipe 38 in place against the projecting support 52. The air supply pipe 38 is connected at one end to a source of air supply by an appropriate conduit and the other end of the pipe 38 is closed by a circular cap 41. When the operation of the source of air supply is started, air is delivered therefrom into the pipe 38 and distributed through the apertures 40 into the air bores 36 as illustrated by arrows in FIG. 5. Then, the air flows down into the horizontally extending portions 36b of the air bores 36 and is injected into the engine exhaust ports through the injection ports 37 as illustrated by arrows in FIG. 4.

As hereinbefore described, the hollow cylindrical inserts are primarily used for the purpose of facilitating quick alignment between the apertures of the air supply pipe and the inlets of the air bores in either the projecting supports on the exhaust manifold or the cylinder head during the installation of the device of this invention. Also as stated hereinbefore, the hollow cylindrical inserts may first be connected into either the apertures of the air supply pipe or the air bores in the exhaust manifold or the cylinder head. Whichever the case may be, it is preferable to facilitate installation that one end of each hollow cylindrical insert which is connected into a particular aperture or bore after the other end is connected be slightly larger in outer diameter than the diameter of that particular aperture or bore. It will, however, be noted that such hollow cylindrical inserts may be totally omitted without presenting any difficulty in obtaining satisfactory alignment between any particular aperture of the air supply pipe and the associated air bore. No minor dimensional inaccuracies caused between the apertures of the air supply pipe and the associated air bores during either the manufacture or installation of the device according to this invention would prevent accomplishment of the satisfactory alignment therebetween which is required to ensure satisfactory air communication from the air supply pipe into the air bores. The elimination of the hollow cylindrical inserts would not result in any appreciable increase in the care required for properly positioning the air supply pipe relative to the exhaust manifold or the cylinder head, insofar as the apertures of the air supply pipe and the air bores are designed to be sufficiently large in diameter. Although the embodiments of FIGS. 1 – 2 and 4 – 5 have both been described as employing an air distribution pipe which is partly semi-circular in cross section, it will be understood that it is equally all right to employ a pipe having a semi-circular cross-section along its entire length as described in connection with the embodiment of FIG. 3, especially in case of the presence of at least one hollow cylindrical insert which will prevent any undesirable axial displacement of the air supply pipe.

While the invention has been described with reference to a few embodiments thereof, it will be understood that any further modifications or variations may be easily made by those skilled in the art without departing from the scope of the invention which is defined by the appended claims.

What is claimed is:

1. In a device for supplying additional combustion air into exhaust ports of a multi-cylinder internal combustion engine, wherein said air is delivered from a source of air supply and distributed into said exhaust ports through a plurality of air distribution bores formed in an engine portion and each communicating at one end with one of said exhaust ports, the improvement which comprises:
    a horizontally disposed air distribution pipe secured to said engine portion and communicating at one end with said source of air supply, said pipe having along at least a portion of its length a semi-circular cross-section defining a flat bottom wall formed therethrough with a plurality of apertures through which said air leaves said pipe, said pipe being closed at the other end;
    said engine portion having an at least partly flat upper exterior surface at which said air distribution bores are open at the other end thereof, said flat bottom wall of said pipe being supported on said flat upper exterior surface of said engine portion, each of said apertures being aligned with said other end of one of said air distribution bores; and
    means for securing said pipe to said engine portion, said securing means comprising:
    at least two metal bands, each of said metal bands comprising a semi-circular central portion encircling said semi-circular cross-section of said pipe in close contact therewith and a pair of flat free end portions extending in opposite directions from said central portion and resting against said flat upper exterior surface of said engine portion; and
    a pair of bolts each connecting one of said free end portions to said upper exterior surface of said engine portion.

2. The invention as defined in claim 1 wherein said engine portion is a cylinder head.

3. The invention as defined in claim 2 wherein said flat bottom wall of said pipe extends substantially along the entire length of said pipe.

4. The invention as defined in claim 1 wherein said engine portion is an exhaust manifold.

5. The invention as defined in claim 4 wherein said flat bottom wall of said pipe extends substantially along the entire length of said pipe.

6. The invention as defined in claim 3, further including at least one vertically disposed hollow cylindrical insert having a upper end received in one of said apertures and a lower end received in said other end of an aligned one of said air distribution bores.

7. The invention as defined in claim 5, further including at least one vertically disposed hollow cylindrical insert having an upper end received in one of said apertures and a lower end received in said other end of an aligned one of said air distribution bores.

8. The invention as defined in claim 4 wherein said exhaust manifold is formed with a plurality of projecting supports thereon in a position immediately above the inlets thereof and contacting an adjacent cylinder head portion, said projecting supports having flat upper exterior surfaces which are flush with one another and cooperate to define said flat upper exterior surface of said engine portion, one of said air distribution bores being provided in each of said projecting supports.

9. The invention as defined in claim 8 wherein said flat bottom wall includes a plurality of flat bottom wall portions each associated in a mutually complementary fashion with one of said projecting supports, each of said metal bands connecting said pipe to one of said projecting supports.

10. The invention as defined in claim 9 wherein one of said projecting supports is provided above each of said inlets of said exhaust manifold.

11. The invention as defined in claim 9 wherein one of said projecting supports is provided above each adjoining pair of said inlets of said exhaust manifold in a manner spanning over said adjoining pair.

12. The invention as defined in claim 2 wherein said each air distribution bore has a substantially L-shaped configuration in longitudinal section and comprises a vertically extending portion communicating with the interior of said pipe and a horizontally extending portion located at the bottom of said vertically extending portion and communicating with said one exhaust port.

13. The invention as defined in claim 10 wherein said each air distribution bore has a substantially L-shaped configuration in longitudinal section and comprises a vertically extending portion communicating with the interior of said pipe and a horizontally extending portion located at the bottom of said vertically extending portion and communicating with said one exhaust port through said adjacent cylinder head portion.

14. The invention as defined in claim 11 wherein each of said air distribution bores comprises a vertically extending portion communicating with the interior of said pipe and a pair of horizontally extending portions located at the bottom of said vertically extending portion, said horizontally extending portions being directed in a substantially mutually perpendicular relationship and each communicating with said one exhaust port through said adjacent cylinder head portion.

15. The invention as defined in claim 1 wherein said pipe has a plurality of portions of a smaller diameter than the remaining portions thereof, each of said metal bands being associated with said pipe in one of said smaller diameter portions.

16. The invention as defined in claim 1, further including a plurality of gaskets interposed between said flat bottom wall of said pipe and said flat upper exterior surface of said engine portion, each of said gaskets cooperating with one of said metal bands for air-tight connection between said pipe and said engine portion.

17. The invention as defined in claim 12 wherein said horizontally extending portion is reduced in diameter at said one end of said air distribution bore to define a downwardly inclined air injection port which is open into said one exhaust port.

18. The invention as defined in claim 13 wherein said adjacent cylinder head portion includes a plurality of downwardly inclined air injection ports each connected at its upper end with said horizontally extending portion, the lower end of said each injection port being open into said one exhaust port.

19. The invention as defined in claim 14 wherein said adjacent cylinder head portion includes a plurality of downwardly inclined air injection ports each connected at its upper end with one of said horizontally extending portions, the lower end of said each injection port being open into said one exhaust port.

* * * * *